Figure 1:
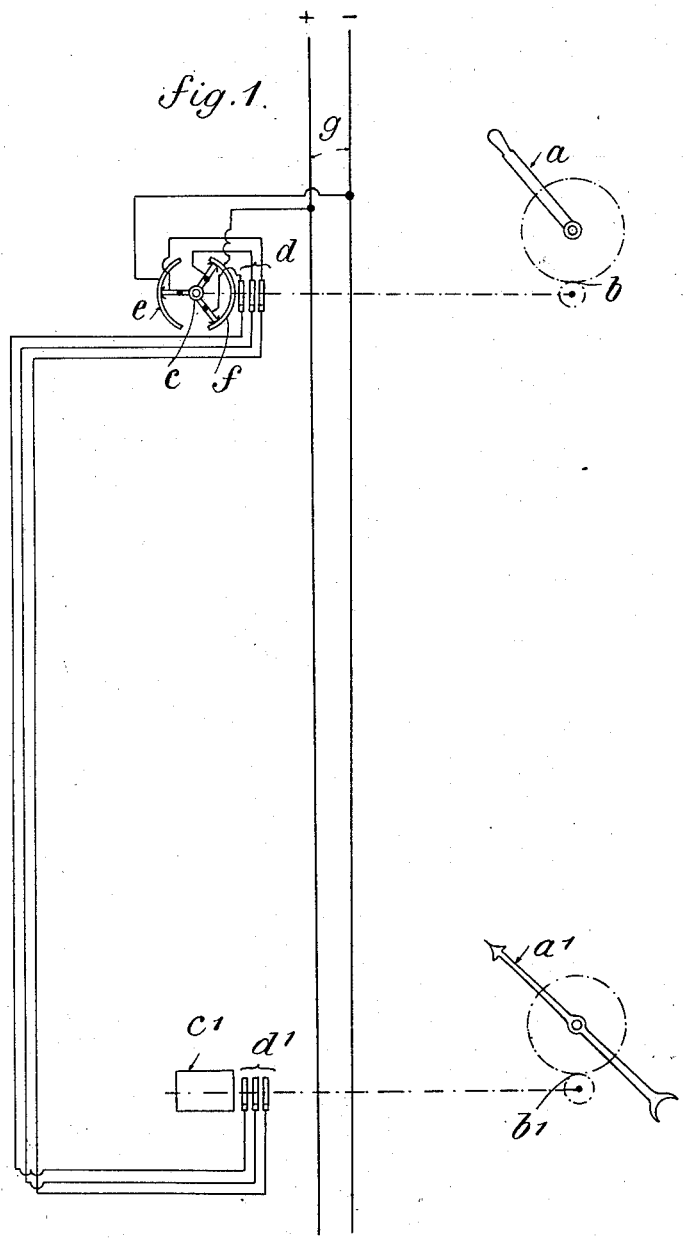

F. A. H. HARLÉ.
CONTROL APPARATUS.
APPLICATION FILED JUNE 11, 1914.

1,292,768.

Patented Jan. 28, 1919.
5 SHEETS—SHEET 2.

Witnesses:

Inventor:
Frédéric Auguste Henri Harlé
by Max Georgii
Atty.

F. A. H. HARLE.
CONTROL APPARATUS.
APPLICATION FILED JUNE 11, 1914.

1,292,768.

Patented Jan. 28, 1919.
5 SHEETS—SHEET 4.

UNITED STATES PATENT OFFICE.

FRÉDÉRIC AUGUSTE HENRI HARLÉ, OF PARIS, FRANCE.

CONTROL APPARATUS.

1,292,768.  Specification of Letters Patent.  Patented Jan. 28, 1919.

Application filed June 11, 1914. Serial No. 844,501.

*To all whom it may concern:*

Be it known that I, FRÉDÉRIC AUGUSTE HENRI HARLÉ, of 26 Avenue de Suffren, Paris, France, engineer, have invented new and useful Improvements in Control Apparatus, which improvements are fully set forth in the following specification.

At the present time arrangements for control at a distance are known, that is to say, arrangements capable of reproducing in a member situated at a distant station a movement of an amplitude predetermined at the sending station. While some of these arrangements are very rapid in action they are not always accurate when the difference of angle between the controlling member and the controlled member has attained a considerable value, this critical difference being due either to a too rapid movement of the controlling member or to an abnormal action at the distant station. Other arrangements which do not work quickly possess the advantage of being always accurate in spite of a momentary large difference of angle between the controlling member and the controlled member.

If with a desire to profit from the qualities of the two types described the two systems were merely combined, a single controlled member being operated by a single controlling member, there would evidently be a conflict between the two controls so soon as the critical difference was attained.

This invention has for its object to remedy this defect.

According to this invention there is combined with a control of both types an arrangement which places the first control out of action before the critical difference is attained but brings it again into action when the difference between the controlling member and the controlled member is of a value less than the critical difference.

The second control arrangement may be made to cease working when the first control is in action or be kept at work during this time.

The two controls need not be based upon the same principle and may even bring different physical agents into action, for example mechanical, liquid, vapor, compressed gas, vacuum and electricity.

The arrangement is suitable not only for the control of a single controlled member, but for the simultaneous control of several members by means of a single controlling member. In the latter case there is even the advantage of maintaining the parallelism of the controlled members with each other, without it being possible for a defect in working of one of the members to react upon the control of the others. Further the part which is momentarily out of order, or which has taken up a wrong position, automatically regains its proper position when the disturbing cause has ceased. It is even possible in this case to make the controlled stations coöperate in maintaining parallelism.

Figure 2:
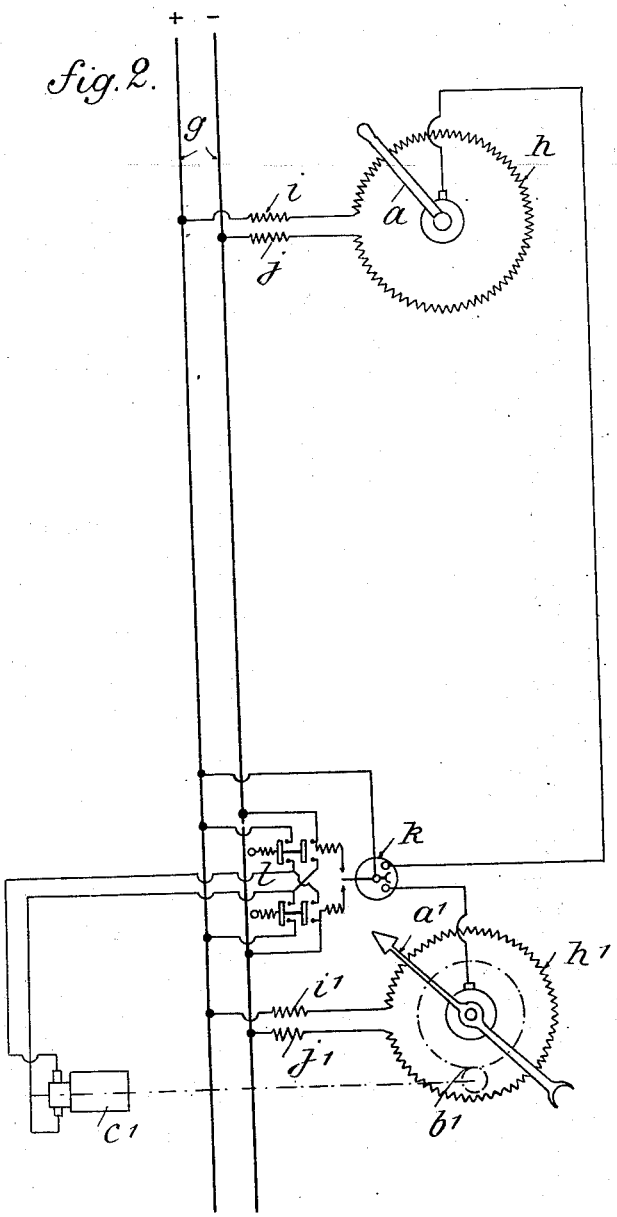
Figure 3:
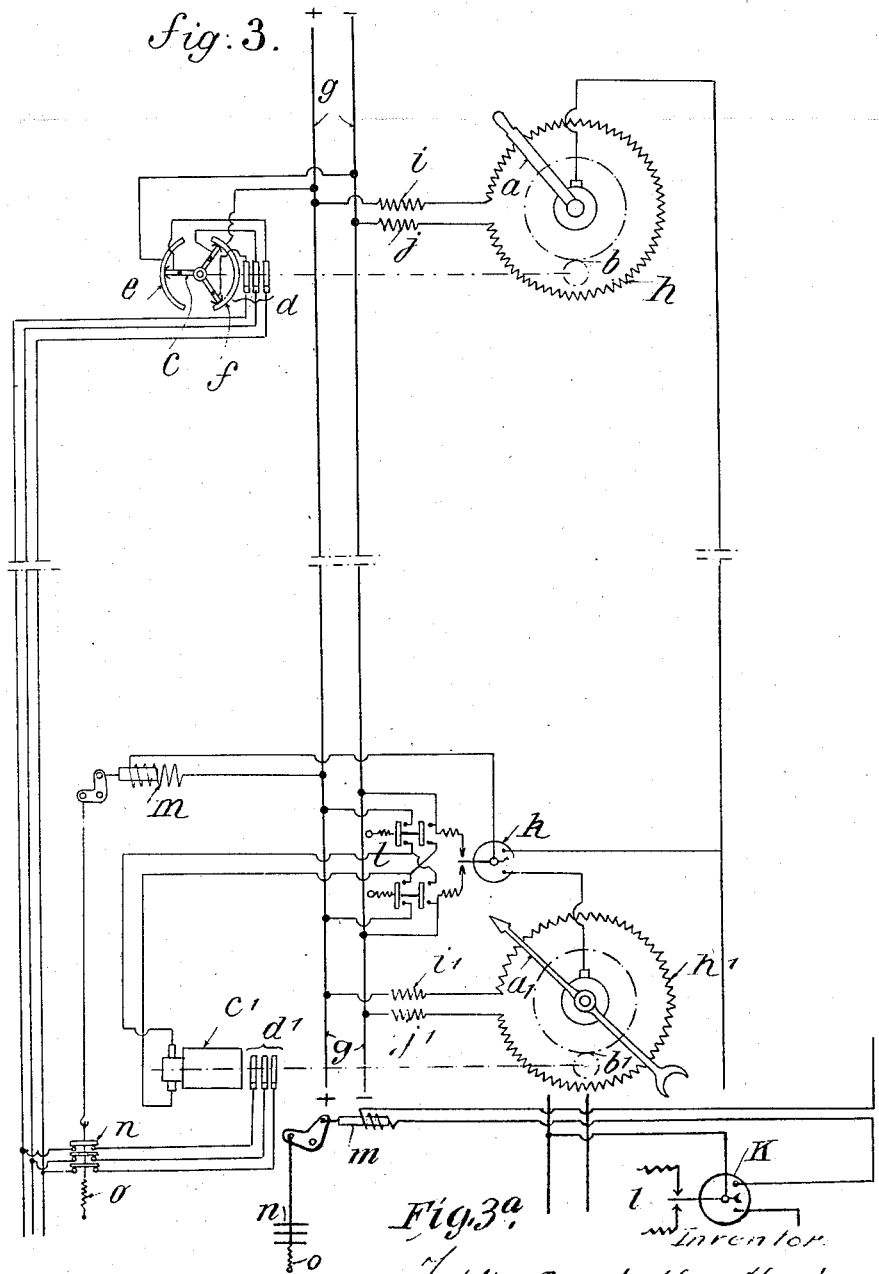

In the accompanying illustrative drawings Figure 1 is a diagrammatic view of a control of the first type, Fig. 2 is a similar view of a control of the second type, Fig. 3 is a diagram showing a control in accordance with this invention, and Fig. 3ª is a detailed diagram showing a modification of a part of the control disclosed in Fig. 3.

Figure 4:
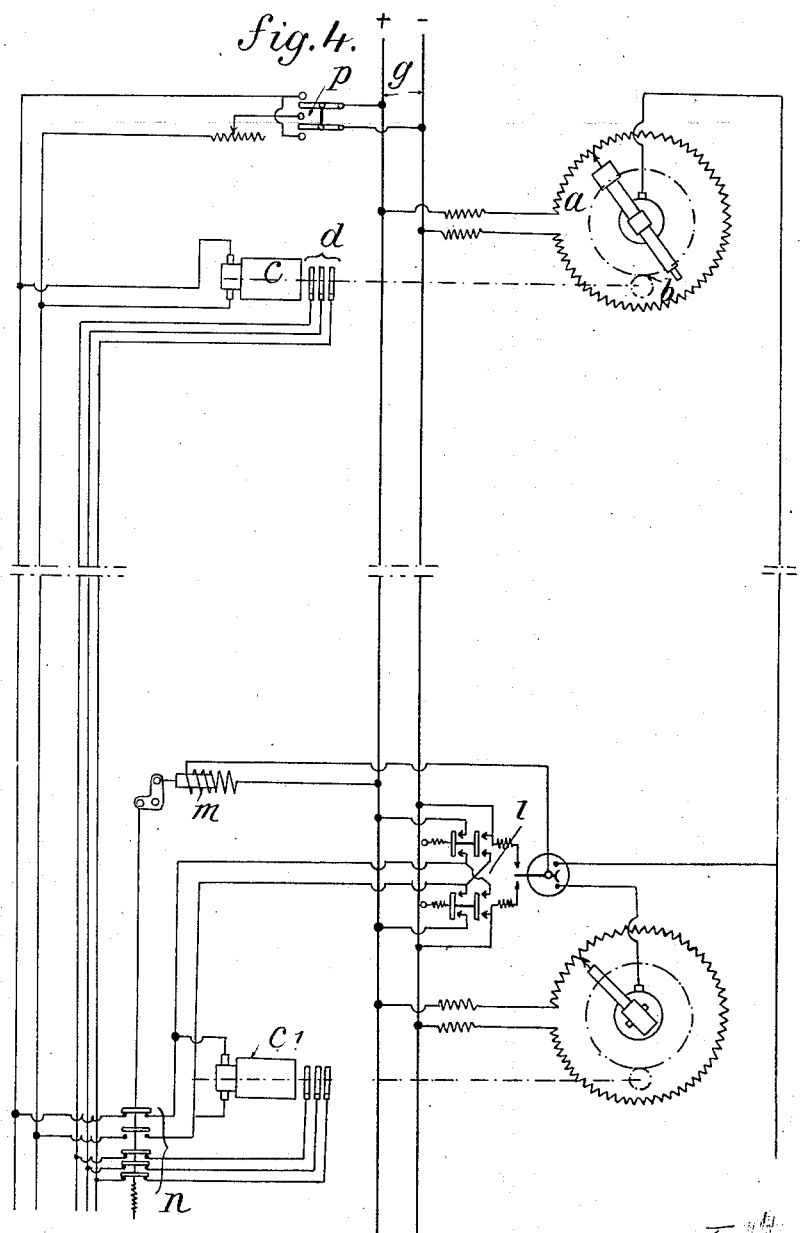
Figure 5:
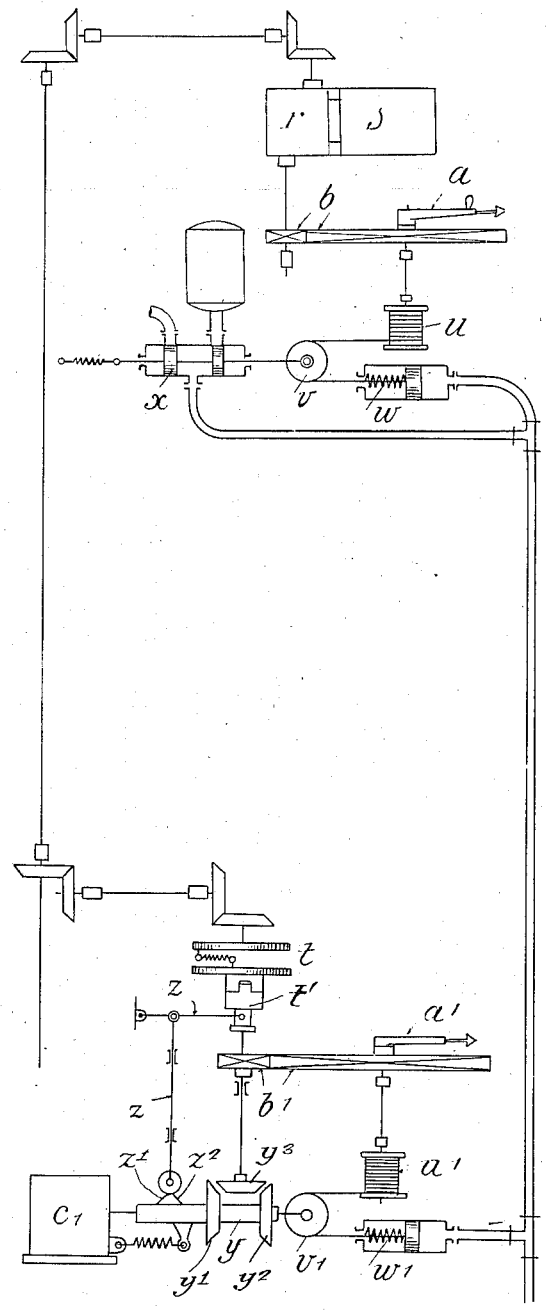

Fig. 4 shows a modification and Fig. 5 shows an arrangement in which the control is half mechanical and half hydraulic.

In the known arrangement shown in Fig. 1, $a$ is the controlling member which causes the star $c$ to turn through the intermediary of gearing $b$; the star $c$ has three brushes each connected to one of three rings $d$. The brushes of the star rub over two separate arcs $e$ and $f$ connected respectively to positive and negative mains $g$ fed with continuous current.

The rings $d$ are connected through the star and three wires to rings $d^1$ at a distant station of a synchronous three phase tripolar motor $c^1$ which drives the controlled member $a^1$ through the intermediary of gearing $b^1$ similar to $b$.

It is known that in such an arrangement the current in the wires connecting the rings $d$ and $d^1$ insure synchronism of the star $c$ and the motor $c^1$; so soon as the star $c$ stops the motor $c^1$ stops. The movement of $a$ is therefore rapidly imparted to $a^1$ but if the resistance of $a^1$ for example exceeds a certain limit or the member $a$ be moved too suddenly and the motor $c^1$ by reason thereof lags to such an extent that it gets out of phase with $c$ and the control is defective, for the return to phase, if this again occurs after the disappearance of the abnormal resistance of $a^1$, will take place with a lag of a certain number of turns. The control while being quick does not insure accurate control so soon as the difference between $a$ and $a^1$ attains a given limit.

Fig. 2 shows another known arrangement founded on a current balancing device, such as the Wheatstone bridge.

The controlling station comprises the controlling member $a$ which makes variable contact with the resistance $h$ and the resistances $i$ and $j$ connected respectively to the positive and negative wires of the continuous current main $g$.

The controlling member $a$ is connected by the balance wire of the bridge to the controlled member $a^1$ at the distant station; this station comprises a motor $c^1$ actuating the member $a^1$ through the gearing $b^1$. The resistances $h^1$ $i^1$ $j^1$ correspond with $h$ $i$ $j$. A galvanometer relay is located at $k$ in the balance wire; $l$ is a commutator reversing relay for driving the motor $c^1$. This relay and also the contact needle of the galvanometer is in a branch from the main $g$. It is known that with such arrangement the breaking of the balance of the bridge at the controlling station by the displacement of $a$ operates the galvanometer relay $k$ and the relay $l$ which causes the motor $c^1$ to turn which stops so soon as $a^1$ moved by it restores the balance of the bridge. This type of control is less rapid than the preceding but it possesses the advantage of not having the defect of the former whatever may be the difference between $a$ and $a^1$ derived for example from a momentary abnormal resistance of $a^1$ or from a too sudden displacement of $a$.

If the two controls illustrated respectively in Figs. 1 and 2 were combined it would be seen that so soon as the critical difference were attained the first control tending to put itself in phase with a certain number of turns of lag would be in conflict with the second control which would not allow a final lag.

If however in accordance with this invention there is combined with these two controls an arrangement placing the first control out of action before or when it fails as indicated in Fig. 3 the problem is solved.

In this figure a member $a$ controls the movement of a member $a^1$ through the two controls shown in Figs. 1 and 2 but in which the winding of an electromagnet $m$ is interpolated in the wire connecting the needle of the galvanometer to the positive main; when the magnet $m$ is excited by the current it actuates a switch $n$ thus disconnecting the motor $c^1$ from the first control. A spring $o$ causes the connection to be again made when current ceases to energize the magnet $m$. The switch $n$ therefore places the first control out of action so soon as the second comes into action.

The arrangement might equally well be located in the bridge balance wire, as shown in Fig. 3ª. The apparatus would then be so regulated that the current of the first control would be broken before the current in the balance wire has attained the value corresponding to the critical difference between $a$ and $a^1$. So soon however as the difference between $a$ and $a^1$ has fallen below the critical value the magnet in question allows the switch to close and to reinstate the first control; the only consequence of this modification would be to make the switch $n$ act less soon, during a certain time the two controls will act simultaneously.

In place of a single controlled station the controlling station may simultaneously control several controlled stations. Such stations similar to the station $a^1$ $b^1$ etc., will be branched upon a prolongation or a branch of the wires connected to the rings $d^1$ of the line $g$ and of the bridge balance wire.

If one of the controlled stations is defective and cannot follow the movement of the other stations it comes out of phase with the rapidly moved control member which continues to insure control at the other controlled stations and remains subjected to the less rapid control which allows it to come into line in spite of its momentary lateness so soon as the disturbing cause has ceased or if the corresponding motor $c^2$ is sufficiently powerful to overcome the increase of resistance opposed to it.

Fig. 4 shows a variation in which the controlling member $a$ in place of being operated by hand is moved by a motor $c$ put into movement in either direction by means of a switch $p$. This motor is provided in the manner of a commutator with three rings $d$; the motor $c^1$ is fed not only with triphase current derived from the motor $c$ and with continuous current derived from the relay $l$ but also with current delivered by the switch $p$. It is not essential that the direct current through the switch $p$ be supplied to the motor $c'$, but it is advantageous to do so because the energy thus supplied will supplement and be added to the energy of the three-phase current $c$ $d$, and the latter may therefore be of less energy. The circuit for this current is broken at the same time as that for the first control by the interrupter $n$ correspondingly modified.

This arrangement is particularly advantageous because if one of the motors $c^1$, etc., turns less quickly than the others by reason of an increase in the resistance opposed to it by the controlled member, the other motors will deliver to it an additional triphase current similar to that of the motor $c$ and thus come to its aid.

Fig. 5 shows the application of the invention to a control half mechanical, half hydraulic. It comprises as the rapid control a known mechanical arrangement, and as the less rapid control a hydraulic arrangement also known; $a$ is the controlling member, $a^1$ the controlled member, $b$ $b^1$ are two trains of gearing of the same ratio; $r$ is an auxiliary motor transmitting by bevel gear power from the motor $s$ to the controlled member through the intermediary of a power regulator $t$; $u$ $u^1$ are drums having on them ropes passing respectively over pulleys $v$ $v^1$ and connected to manometric pistons $w$ $w^1$; $x$ is a distributer or oil under pressure, $y$ a reversing gear, and $z$ an unclutching arrangement having two inclines $z^1$, $z^2$ for unclutching the power regulating arrangement when its roller is no longer at the apex of the inclines.

The rapid control is effected by the train $b$ the auxiliary motor $r$, the motor $s$, the regulator $t$ and the train $b^1$. The regulator $t$ is formed of two cranks connected by a spring. If the resistance of $a^1$ becomes too great the regulator $t$ will yield, will lag more than 180° and if it were again to enter into engagement would do it with a lag of one or more turns between the two parts. The first control would thus fail.

The second and less rapid control is insured by the winding or unwinding of the rope from the drum $u$ having for effect to move the distributer $x$ and to vary the pressure in the control pipe and also behind the pistons $w$ $w^1$. The variation of pressure moves $w$ which places $x$ to exhaust; it displaces at the same time $w^1$, which places $y$ in gear and causes the actuation through $c^1$ of the controlled member $a^1$ until the drum $u^1$ has on unwinding or winding up its rope brought $y$ to the unclutching position. This less rapid control insures the constant accuracy of the control whatever may be the angle between $a$ and $a^1$.

Assuming that $a$ is rotated in a clockwise direction, a control will be effected through the motors $r$ and $s$, the regulator $t$, and the associated gearing. Before $a'$ begins to lag behind $a$, the drum $u'$ rotates at such a speed that the slack in the rope passing around pulley $v'$, caused by the movement of the piston $w'$, is entirely taken up, thus holding the pulley $v'$, shaft $y$ and gears $y'$, $y^2$ in neutral position. When $a'$ begins to lag or if $a'$ runs more rapidly, the rope will be wound up more slowly or more rapidly, respectively, thereby permitting or causing the shaft $y$ to move axially to place in action the less rapid control. When the less rapid control becomes operative the lever $z$ disconnects the more rapid control from the gearing driving the member $a'$.

The combination of the two controls will evidently result at the critical difference in a conflict between the controls. To prevent this the auxiliary arrangement $z$ places the regulator $t$ out of gear before the critical difference has been reached.

In the double incline $z'$, $z^2$ illustrated the unclutching takes place so soon as the second control comes into action. By arranging a flat between the two inclines or by interposing in the control $z$ a suitable retarding arrangement, the moment at which the first control is placed out of action may be delayed.

In Fig. 5 the operation of the second and less rapid control is as follows: Upon the movement of the member $a$ in one direction or another the cable is wound or unwound upon the drum $u$ with the result that the pulley $v$ and the valve attached to it move to admit or exhaust the pressure behind the pistons $w$ $w'$ whereby a movement of the pistons proportional to the movement of the member $a$ results, after which the pulley $v$ and the valves attached thereto occupy their original positions. The movement of piston $w'$ will have caused the pulley $v'$ to move to effect driving engagement between one of the gears $y'$, $y^2$, attached to the pulley $v'$ and the bevel gear $y^3$ upon the shaft carrying the gear $b'$. $a'$ is thus caused to rotate until such engagement is broken which occurs when $a'$ occupies a position corresponding to that to which $a$ has been moved. Upon movement of the gear shaft $y$ from central position, the inclines $z'$, $z^2$ permit the lever $z$ to operate the clutch member $t'$ to disconnect the first or rapid control.

As in Figs. 3 and 4 there may be several stations controlled by the single station. The same advantages are attained in this case also.

Having now particularly described and ascertained the nature of my said invention and in what manner the same is to be performed, I declare that what I claim is:

1. In apparatus for controlling movements at a distance, the combination with a quick but not always accurate control, of a slower but always accurate control, and means for automatically placing the quick control out of action when it becomes inaccurate.

2. In apparatus for controlling movements at a distance, the combination with a quick but not always accurate control of a slower but always accurate control and means for automatically placing the quick control out of action when it becomes inaccurate, said slower control being operable while the quick control is acting.

3. In apparatus for controlling movements at a distance, the combination with a quick but not always accurate control of a slower but always accurate control and means for automatically placing the quick control out of action, the quick control being systematically rendered inactive as soon as the slower one is set in action.

4. In apparatus for controlling movements at a distance, the combination with a quick but not always accurate control of a slower but always accurate control and means for automatically placing the quick control out of action when it becomes inaccurate, the quick control being placed out of action by switching means connected to the slower one.

5. In apparatus for controlling movements at a distance, the combination with a quick but not always accurate control, of a slower but always accurate control, means for automatically placing the quick control out of action, an auxiliary supply arranged in connection with the latter control and in such a manner as to afford help to a further slower control, and means to place the same out of action together with the quick control.

6. In apparatus for controlling movements at a distance, the combination with a quick but not always accurate control of a slower but always accurate control, means for automatically placing the quick control out of action, and an auxiliary supply arranged in connection with the latter control and in such a manner as to afford help to a further slower control.

7. In apparatus for controlling movements at a distance, the combination with a quick but not always accurate control, of a slower but always accurate control, means for automatically placing the quick control out of action, a controlling member, and a motor for moving the same, the motor being adapted to deliver the whole or a part of the power supplied to the quick control.

8. In apparatus for controlling movements at a distance, the combination with a quick but not always accurate control of a slower but always accurate control and means for automatically placing the quick control out of action, the quick control being a three phase and revolving field control system while the slower one comprises a current balancing device.

9. In apparatus for directing movements of devices at a distance, the combination with a movable controlling device of a movable member controlled by said device, quick control means whereby a movement of said controlling device effects a quick but not always accurate movement of said member, slower control means whereby a movement of said controlling device effects a slower but always accurate movement of said member, and means whereby said quick control means is automatically rendered inactive when the slower control becomes operative, said slower control means being rendered active when the quick movement of said member by said quick control means becomes inaccurate.

10. In an apparatus for reproducing movements at a receiving station corresponding to predetermined movements at a sending station, the combination with a movable controlling device of a member movable in accordance with movements of said device, quick acting control means whereby a movement of said controlling device effects a quick but not always accurate movement of said member, the difference between the movements of said device and member having a critical value, slow acting control means whereby a movement of said controlling device effects a slower but substantially accurate movement of said member, and means whereby the quick control is automatically rendered inactive when the difference between the movement of said device and member reaches said critical value.

11. In apparatus for reproducing at a receiving station movements of an amplitude predetermined at a sending station, the combination with a quick control mechanism in which the movement at the receiving station is not accurate during a portion of said movement, of a slower control mechanism that is substantially accurate, and means for rendering said quick control mechanism inoperative when it becomes inaccurate.

In testimony whereof I have signed this specification in the presence of two subscribing witnesses.

FRÉDÉRIC AUGUSTE HENRI HARLÉ.

Witnesses:
HANSON C. COXE,
GASTON DE VESTSAL.